United States Patent
Ksiazek et al.

(10) Patent No.: US 12,441,251 B2
(45) Date of Patent: Oct. 14, 2025

(54) VEHICLE CAMERA, CAMERA SYSTEM, VIDEO PROCESSING METHOD, SOFTWARE, AND VEHICLE INCORPORATING THE SAME

(71) Applicant: Aptiv Technologies AG, Schaffhausen (CH)

(72) Inventors: Maciej Ksiazek, Dublin (IE); Pawel Markiewicz, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 3 days.

(21) Appl. No.: 18/364,278

(22) Filed: Aug. 2, 2023

(65) Prior Publication Data
US 2024/0042937 A1  Feb. 8, 2024

(30) Foreign Application Priority Data

Aug. 3, 2022 (EP) .................................... 22188616

(51) Int. Cl.
*B60R 1/29* (2022.01)
*B60R 11/04* (2006.01)
(Continued)

(52) U.S. Cl.
CPC ............... *B60R 1/29* (2022.01); *B60R 11/04* (2013.01); *G06T 5/80* (2024.01); *G06V 20/59* (2022.01); *G06T 2207/30268* (2013.01)

(58) Field of Classification Search
CPC ... B60R 11/04; B60R 1/29; B60R 2011/0026; G06T 5/80; G06T 2207/30268; G06V 20/59; H04N 23/55; H04N 23/698
See application file for complete search history.

(56) References Cited

U.S. PATENT DOCUMENTS 9,656,621 B2 * 5/2017 Curtis ................. G08B 21/182
10,640,040 B2 * 5/2020 Ihlenburg ................ H04N 7/18
(Continued)

FOREIGN PATENT DOCUMENTS

CN   112216067    1/2021
JP   H11112968    4/1999
(Continued)

OTHER PUBLICATIONS

"Extended European Search Report", EP Application No. 22188616.1, Feb. 9, 2023, 7 pages.
(Continued)

*Primary Examiner* — Tsion B Owens
(74) *Attorney, Agent, or Firm* — Harness, Dickey & Pierce, P.L.C.

(57) ABSTRACT

The present disclosure relates to a vehicle camera, camera system including the same, video processing method, and a computer software product, and in aspects may be particularly relevant to vehicular camera systems for monitoring the interior and exterior of the vehicle. In an aspect, a vehicle camera includes an imager and an ultra-wide-angle lens assembly for focusing onto the imager an ultra-wide-angle image having a field of view. The camera is configured to be mounted within a vehicle such that the field of view includes an interior portion representing part of the interior of the vehicle and exterior portion representing part of the exterior of the vehicle.

15 Claims, 2 Drawing Sheets

(51) Int. Cl.
    *G06T 5/80*           (2024.01)
    *G06V 20/59*       (2022.01)

(56)                  References Cited

U.S. PATENT DOCUMENTS

| | | | |
|---|---|---|---|
| 2018/0272937 A1* | 9/2018 | Kumon | B60R 1/04 |
| 2019/0061621 A1* | 2/2019 | Chae | H04N 23/698 |
| 2021/0155167 A1* | 5/2021 | Lynam | B62D 15/028 |
| 2022/0360693 A1* | 11/2022 | Stein | H04N 23/90 |

FOREIGN PATENT DOCUMENTS

| | | | |
|---|---|---|---|
| JP | 2008028606 A | | 2/2008 |
| JP | 2011124879 | | 6/2011 |
| JP | 2011124879 A | * | 6/2011 |
| JP | 5114101 | | 1/2013 |
| JP | 5720400 | | 5/2015 |

OTHER PUBLICATIONS

Examination Report regarding European Patent Application No. 22186616.1, dated Sep. 2, 2025.

* cited by examiner

VEHICLE CAMERA, CAMERA SYSTEM, VIDEO PROCESSING METHOD, SOFTWARE, AND VEHICLE INCORPORATING THE SAME

INCORPORATION BY REFERENCE

This application claims priority to European Patent Application No. EP22188616.1, filed Aug. 3, 2022, the disclosure of which is incorporated by reference in its entirety.

BACKGROUND

In modern vehicles, camera systems have become increasingly important in implementing safety and driver assistance functionality. For example, an interior camera system may be used to implement one or more of driver gaze tracking, hands-on-wheel detection, seatbelt compliance detection, drowsiness detection, and driver attention monitoring. At the same time, an exterior camera system will often also be provided to implement functions such as pedestrian detection, traffic sign recognition, leading vehicle tracking, and autonomous emergency braking.

To implement such vision-based sensing systems, vehicles are provided with at least two camera units with fields of view directed to the vehicle's interior and exterior, respectively. For each camera unit, image capture and processing hardware, along with the associated wiring, must be provided. For instance, the interior camera system will often have its own electronic control unit for processing the video feed provided thereby, with communication wiring provided between this and the camera unit itself, as well as power supply cabling to both units. As a consequence, each additional camera unit adds to costs and introduces additional manufacturing complexities.

Accordingly, there remains a need to reduce costs associated with conventional vehicle camera systems.

SUMMARY

The present disclosure relates to a vehicle camera, camera system including the same, video processing method and computer software product. In aspects, the present disclosure may be particularly relevant to vehicular camera systems for monitoring the interior and exterior of the vehicle.

According to a first aspect, there is provided a vehicle camera including an imager; and an ultra-wide-angle lens assembly for focusing onto the imager an ultra-wide-angle image having a field of view, wherein the camera is configured to be mounted within the vehicle such that the field of view includes an interior portion representing part of the interior of the vehicle and an exterior portion representing part of the exterior of the vehicle.

In this way, a single vehicle camera unit may be provided for imaging both the vehicle interior and exterior simultaneously. That is, by providing the vehicle camera with a lens assembly and imager having a field of view which is sufficiently wide that it can be mounted within the vehicle to view the relevant parts of the vehicle interior on one side, as well as an opposing view of the vehicle's exterior on the other side. Consequently, the need for two or more separate cameras to image parts of the interior and exterior of the vehicle is removed. In turn, the camera system allows for simplified manufacturing, installation, and lower component costs.

In embodiments, the imager includes an interior region associated with the interior portion of the image and an exterior region associated with the exterior portion of the image. In this way, respective regions of the imager are used to generate images for the interior and exterior portions of the field of view. This may allow for simplified processing of the image regions, for instance, by directing data generated by the different regions to different processing pipelines.

In embodiments, the field of view includes an excluded portion of the field of view between the interior portion and the exterior portion. In this way, the excluded region may be associated with the part of the field of view that is not of interest and hence may be minimised by the lens.

In embodiments, the imager includes an excluded region associated with the excluded portion. In this way, the excluded region may be associated with the part of the field of view that is not of interest, and hence does not need to be imaged. As a result, data processing overhead may be reduced by limiting imaging to only the relevant parts of the field of view.

In embodiments, the imager includes a plurality of pixels for generating image data from the interior region and the exterior region, and wherein the excluded region includes inactive pixels or non-processed pixels. In this way, cost may be reduced by limiting active or processed parts of the imager to only the regions associated with the relevant portions of the field of view. In embodiments, the imager includes a colour filter array, such as a Bayer filter.

In embodiments, the imager comprises a first imager part for generating image data from the interior region and a second imager part for generating image data from the exterior region. In this way, the imager may be provided in two separate parts, each associated with a different portion of the field of view. As such, two imager parts or units may be provided for separately imaging the interior and exterior views.

In embodiments, the field of view is 120 degrees or more.

In embodiments, the ultra-wide-angle lens assembly includes: a first focal region having a first set of optical characteristics for focusing the interior portion of the field of view onto the imager, and a second focal region having a second set of optical characteristics for focusing the exterior portion of the field of view onto the imager. In this way, the lens assembly may include one or more bifocal lens elements for focusing the interior and exterior views separately. This may thereby allow for optimisation of the image for each portion of the field of view.

In embodiments, the vehicle camera further includes a mount for mounting the camera such that the field of view includes the interior and exterior portions.

In embodiments, the mount for mounting the camera is one of a roof module mount or a base of the windshield mount. In this way, the camera may be conveniently mounted within the vehicle for visualising the interior and exterior portions of the field of view.

According to a second aspect, there is provided a vehicle camera system including the above vehicle camera, and an image processor for processing ultra-wide-angle images formed on the imager, wherein the image processor includes an image splitter block for separating the interior and exterior portions of the image. In this way, a system is provided for capturing and processing images of both the interior and exterior of a vehicle using a single camera.

In embodiments, the image processor further includes at least one de-warping block for processing at least a portion of the image to correct image distortions. In this way, the distortions arising from the ultra-wide-angle lens may be corrected to provide a normalised image for subsequent processing or human perception. Accordingly, for example, this may allow existing image processing machine learning models to be used for subsequent processing, thereby avoiding the need to retrain or reconfigure these existing systems.

In embodiments, the image processor includes an interior de-warping block for processing the interior portion of the image to correct image distortions, and an exterior de-warping block for processing the exterior portion of the image to correct image distortions. In this way, each of the de-warping processes may be optimised for the particular characteristics of the interior or exterior portions of the image.

In embodiments, the image processor further includes: an interior processing part for processing the interior portion of the image and outputting a corrected interior image feed for use in one or more interior sensing functions; and an exterior processing part for processing the exterior portion of the image and outputting a corrected exterior image feed for use in one or more exterior sensing functions. In this way, the processing of the interior and exterior portions of the field of view may be independently customised to optimise them for the particular characteristics of that image portion. For example, each processing part may process light intensity differently based on the differing lighting conditions associated with the inside and outside of the vehicle.

In embodiments, the interior sensing functions include at least one of driver gaze tracking, hands-on-wheel detection, seatbelt compliance detection, drowsiness detection, and driver attention monitoring, and the exterior sensing functions include at least one of pedestrian detection, traffic sign recognition, leading vehicle tracking, and autonomous emergency braking.

According to a third aspect, there is provided a vehicle camera video processing method including the steps of: receiving image data from an imager of ultra-wide-angle images having a field of view which includes an interior portion representing part of the interior of the vehicle and an exterior portion representing part of the exterior of the vehicle; and processing the image data by separating the interior and exterior portions of each image using an image splitter block.

In embodiments, the step of processing the image data further includes correcting image distortions using at least one de-warping block.

According to a third aspect, there is provided a vehicle comprising: a vehicle camera having an imager; and an ultra-wide-angle lens assembly for focusing onto the imager an ultra-wide-angle image having a field of view, wherein the camera is mounted within the vehicle such that the field of view includes an interior portion representing part of the interior of the vehicle and an exterior portion representing part of the exterior of the vehicle.

According to a fourth aspect, there is provided a non-transitory computer readable medium including instructions which, when executed by one or more processors, implement the above method. According to a further aspect, there is provided a computer software product including instructions which, when executed by one or more processors, implement the above method.

BRIEF DESCRIPTION OF DRAWINGS

Illustrative embodiments will now be described with reference to the accompanying drawings in which.

DETAILED DESCRIPTION

The present disclosure relates to a vehicle camera, camera system including the same, video processing method and computer software product, and in aspects may be particularly relevant to vehicular camera systems for monitoring the interior and exterior of the vehicle.

Figure 1:
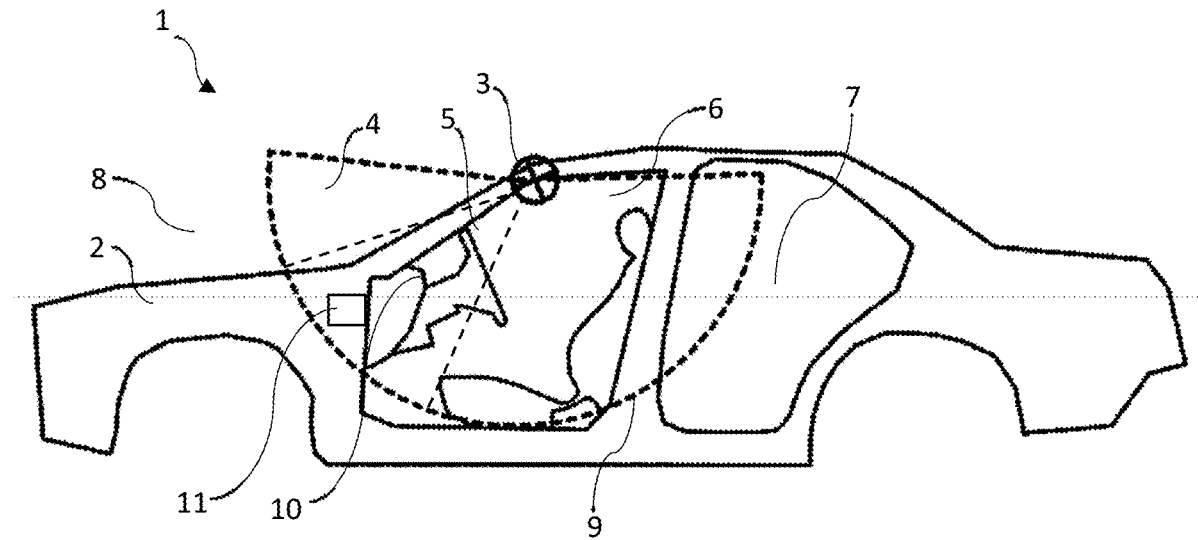
FIG. 1 is a cross-sectional diagram of a vehicle camera system mounted within a vehicle according to a first embodiment.

FIG. 1 shows a vehicle camera system 1 provided within a vehicle 2. The camera system 1 includes a vehicle camera 3 mounted into a rear-view mirror module 9 on the interior roof of the vehicle 2.

The vehicle camera system 1 further includes a camera controller 11 for processing image data from the camera 3. It will be understood that the camera controller 3 may be integrated into an electronic control unit (ECU) within the vehicle 2. The camera controller 11 is communicatively connected to the camera 3 using the vehicles' communication network.

As is described in further detail below, the camera 3 has a field of view 9 that is greater than 180 degrees. Consequently, from the camera's mounted position, the field of view 9 encompasses part of both the exterior 8 and the interior 7 of the vehicle. In particular, the field of view 9 includes an exterior portion 4, which is forward-facing and observes part of the exterior 8 of the vehicle 2 through the front windscreen.

The field of view 9 further includes an interior portion 6 which is rearward-facing and observes part of the interior 7 of the vehicle 2. The interior portion 6 allows for imaging of the vehicle's cabin to provide for sensing of the driver's upper body and face, as well as passenger occupancy.

Between the exterior 4 and interior portions 6, the field of view 9 includes an excluded portion 5 which would otherwise view the vehicle's dashboard 10. As this portion does not contain any pertinent visual information, it can therefore be ignored and is consequently excluded from image processing.

Figure 2:
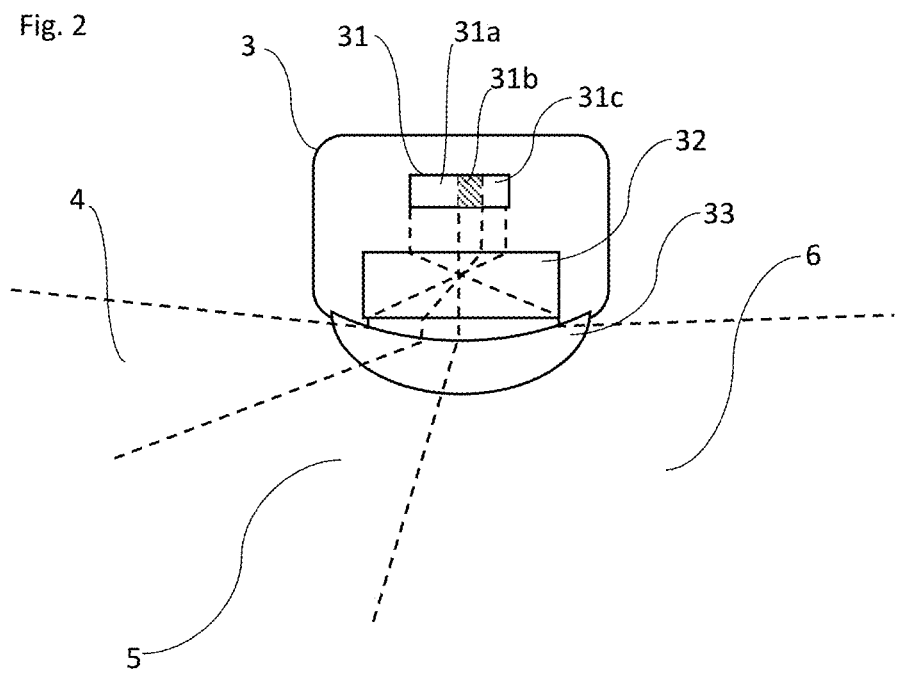
FIG. 2 is a cross-sectional diagram of a vehicle camera forming part of the vehicle camera system shown in FIG. 1.

FIG. 2 shows a cross-sectional diagram of the vehicle camera 3, which includes an imager 31 and an ultra-wide-angle lens assembly including optical elements 32,33. In this embodiment, the optical elements 32,33 are non-linear lenses for providing, in combination with the imager, the ultra-wide field of view greater than 180 degrees. This thereby allows both the exterior 4 and interior 6 portions of the field of view to be focused onto the imager 31.

The imager 31 includes regions 31a, 31b and 31c. These regions correspond to portions 6, 5 and 4 of the field of view 9, respectively. The regions 31a and 31c are active regions of the imager 31 and contain a plurality of pixels for generating image data from the focused image projected thereon. Region 31a is an interior region associated with the interior portion 6 of the field of view, and region 31c is an exterior region, associated with the exterior portion 4 of the field of view.

Region 31b is an excluded region associated with the excluded portion 5 of the field of view. As this portion is not of interest, the pixels in this region are not processed. In other embodiments, this excluded region 31b may be provided with inactive pixels or without pixels.

The optical elements 32,33 are configured such that their optical properties act to minimise the size of the excluded region 31b. This allows the sizes of the interior and exterior regions 31a,31c to be maximised and hence provides for a higher resolution image of these regions of interest.

Figure 3:
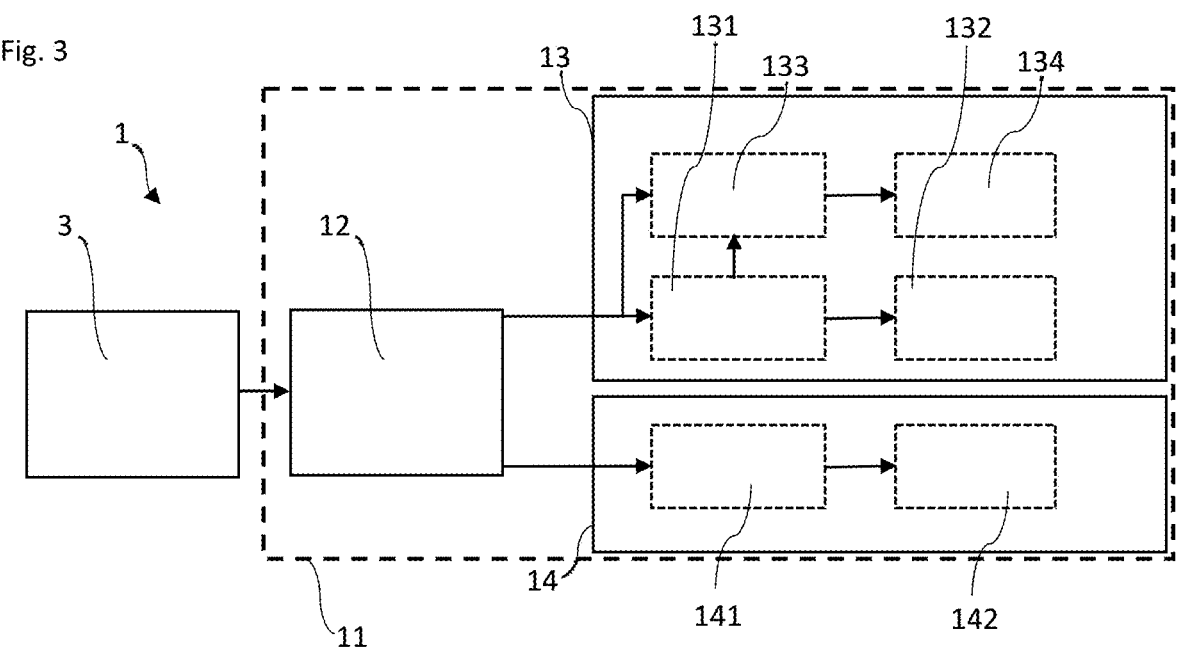
FIG. 3 is a block diagram of the parts of the vehicle camera system shown in FIG. 1.

FIG. 3 shows a block diagram of the parts of the vehicle camera system 1 shown in FIG. 1. As mentioned previously, the vehicle camera system 1 includes the vehicle camera 3 shown in FIG. 2, and the camera controller 11. The camera controller 11 includes processing blocks 12, 13 and 14 for processing the image data captured by the imager 31. Firstly, an image splitter block 12 receives the ultra-wide-angle image formed on the imager 31 and separates it into two outputs corresponding to the interior and exterior portions of the field of view. The outputs of the image splitting block 12 are then fed into interior processing block 13 and exterior processing block 14 respectively.

The interior processing block 13 includes a de-warping block 131, the output of which feeds into an interior processing part 132. The interior processing block 13 also includes an image signal processing (ISP) block 133, the output of which feeds into a visualisation block 134. The exterior processing block 14 includes a de-warping block 141, the output of which feeds into an exterior processing part 142. The de-warping blocks 132 and 141 are used to correct image distortions arising from the ultra-wide angled lens. At the same time, as the de-warping blocks 132 and 141 are associated with the interior and exterior portions respectively, they may also correct for the different lighting conditions and image needs associated with interior and exterior image processing. The interior processing part 132 and exterior processing part 142 are respectively used to process the interior and exterior image data for interior and exterior sensing and advanced driver-assistance system (ADAS) functions. The ISP block 133 and visualisation block 134 may be used for generating an interior video image of the interior of the vehicle, as described in further detail below.

In use, light passes through the lens elements 32, 33 and is focused onto the imager 31 to form an ultra-wide-angle image. The field of view includes the exterior portion 4 projected onto exterior region 31c of the imager 31, and an interior portion 6 projected onto interior region 31a of the imager 31. The excluded portion 5 falls onto inactive region 31b of the imager 31.

The image splitter block 12 separates the interior and exterior portions into separate streams for subsequent processing, with the interior portion being de-warped through de-warping block 131 to correct image distortions and output a corrected interior image. This may then be further processed by processing part 132 to provide interior sensing functions, such as for monitoring the driver's gaze, their seatbelt status, and their hand position on the steering wheel.

The interior portion of the image may also be processed by the image signal processing block 133 in order to suppress the infrared component of the image data and extract the red, green, and blue (RGB) colour components for outputting an image to the visualisation block 134 for generating an image suitable for human vision. For example, the generated image may be used for video calls and/or telepresence functions within the vehicle 2.

The exterior portion of the image similarly undergoes de-warping via block 141 to correct distortions and output a corrected exterior image which is processed further by processing part 142 to provide exterior sensing functions such as ADAS functions for monitoring the external environment of the vehicle 2.

Figure 4:
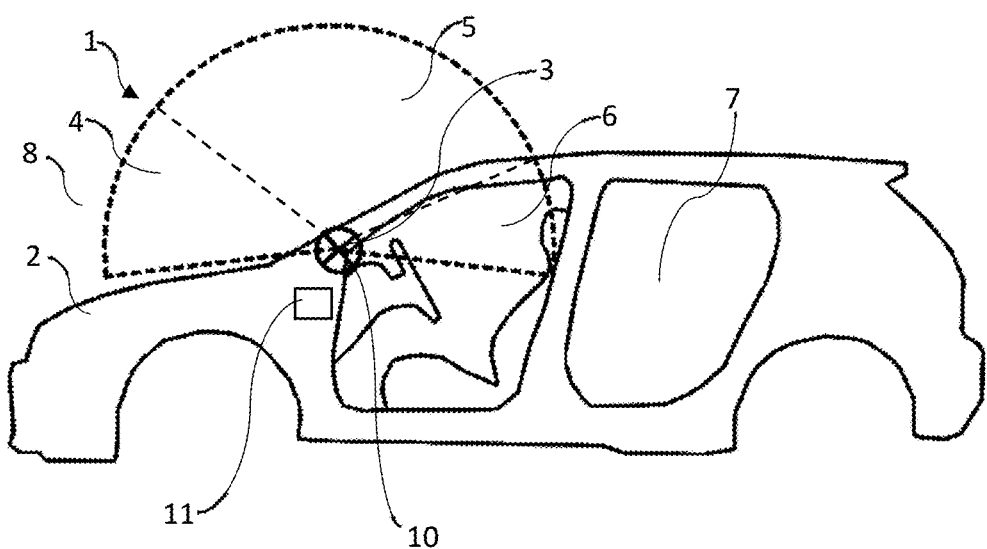
FIG. 4 is a cross-sectional diagram of a vehicle camera system mounted within a vehicle according to a second embodiment.

FIG. 4 shows a second embodiment, which is substantially the same as the first except that the camera 3 in this case is mounted to the base of the windshield or dashboard 10 of the vehicle 2. As with the first embodiment, the field of view includes an interior portion 6 for observing part of the interior of the vehicle and an exterior portion 4 for observing part of the exterior of the vehicle, with the position of these portions being configured to account for the lower mounting position. Depending on the vehicle, this mounting position may provide a better viewpoint of the relevant parts of the interior and exterior of the vehicle.

Accordingly, it will be understood that the above arrangements allow for a single camera unit to be used to observe both the interior and exterior of the vehicle. This may thereby help to minimise costs and complexity as there is no need for separate interior and exterior camera units or the associated wiring and mounting parts.

It will be understood that the embodiments illustrated above show applications only for the purposes of illustration. In practice, embodiments may be applied to many different configurations, the detailed embodiments being straightforward for those skilled in the art to implement.

For example, it will be appreciated that whilst the above embodiments are described as including de-warping blocks, these may be omitted, and the camera controller may perform image processing on distorted images. For example, an artificial intelligence model used for image processing may be trained on the ultra-wide field of view images to allow image data to be analysed directly.

Furthermore, rather than a single imager part, in embodiments, the imager may include two distinct parts for the interior and exterior portions of the field of view respectively.

Finally, it will also be understood that although the above embodiments have been described in the context of mounting the camera centrally to provide a view of the exterior of the front of the vehicle and of the interior cabin simultaneously, alternate mounting positions are also envisaged. For example, in embodiments, the camera may be mounted off-centre, for instance in either side pillar of the vehicle, or in the rear of the vehicle for providing a view of the rear seats and the exterior of the vehicle seen through the rear windshield.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. An apparatus comprising:
   an imager; and
   an ultra-wide-angle lens assembly configured for focusing onto the imager an ultra-wide-angle image having a field of view, the apparatus configured to be mounted within a vehicle such that the field of view includes an interior portion representing part of an interior of the vehicle and an exterior portion representing part of an exterior of the vehicle;

wherein the imager comprises a plurality of pixels for generating image data of the interior portion and the exterior portion, and includes an excluded region for not generating image data of an excluded portion between the interior portion and exterior portion; and wherein the ultra-wide-angle lens assembly comprises a first focal region having a first set of optical characteristics for focusing the interior portion of the field of view onto the imager on a first side of the excluded region, and a second focal region having a second set of optical characteristics for focusing the exterior portion of the field of view onto the imager on a second side of the excluded region.

2. The apparatus according to claim 1,
wherein at least one of: the excluded region comprises inactive pixels or the excluded region is without pixels.

3. The apparatus according to claim 1, wherein the imager further comprises:
a first imager part configured for generating image data from the interior portion; and
a second imager part configured for generating image data from the exterior portion.

4. The apparatus according to claim 1, wherein the field of view is 120 degrees or more.

5. The apparatus according to claim 1, further comprising:
a mount for mounting the apparatus such that the field of view includes the interior portion and the exterior portion.

6. A system comprising:
a vehicle camera configured to be mounted within a vehicle such that a field of view of the vehicle camera includes an interior portion representing part of an interior of the vehicle and an exterior portion representing part of an exterior of the vehicle, the vehicle camera comprising:
  an imager comprising a plurality of pixels configured for generating image data of the interior portion and exterior portion, and including an excluded region for not generating image data of an excluded portion between the interior portion and exterior portion; and
  an ultra-wide-angle lens assembly configured for focusing onto the imager an ultra-wide-angle image having the field of view, the ultra-wide-angle lens assembly comprising a first focal region having a first set of optical characteristics for focusing the interior portion of the field of view onto the imager on a first side of the excluded region, and a second focal region having a second set of optical characteristics for focusing the exterior portion of the field of view onto the imager on a second side of the excluded region; and
an image processor configured for processing the ultra-wide-angle images formed on the imager, the image processor comprising:
  an image splitter block for separating the interior and exterior portions of the ultra-wide-angle image.

7. The system according to claim 6, wherein the image processor further comprises:
an interior processing part configured for processing the interior portion of the ultra-wide-angle image and outputting a corrected interior image feed for use in one or more interior sensing functions; and
an exterior processing part configured for processing the exterior portion of the ultra-wide-angle image and outputting a corrected exterior image feed for use in one or more exterior sensing functions.

8. The system according to claim 6, wherein the image processor further comprises:
at least one de-warping block configured for processing at least a portion of the ultra-wide-angle image to correct image distortions.

9. A system according to claim 8, wherein the image processor further comprises:
an interior processing part configured for processing the interior portion of the ultra-wide-angle image and outputting a corrected interior image feed configured for use in one or more interior sensing functions; and
an exterior processing part configured for processing the exterior portion of the ultra-wide-angle image and outputting a corrected exterior image feed configured for use in one or more exterior sensing functions.

10. The system according to claim 9, wherein the image processor further comprises:
an interior de-warping block configured for processing the interior portion of the ultra-wide-angle image to correct image distortions; and
an exterior de-warping block configured for processing the exterior portion of the ultra-wide-angle image to correct image distortions.

11. The system according to claim 8, wherein the image processor further comprises:
an interior de-warping block configured for processing the interior portion of the ultra-wide-angle image to correct image distortions; and
an exterior de-warping block configured for processing the exterior portion of the ultra-wide-angle image to correct image distortions.

12. The system according to claim 11, wherein the image processor further comprises:
an interior processing part configured for processing the interior portion of the ultra-wide-angle image and outputting a corrected interior image feed for use in one or more interior sensing functions; and
an exterior processing part configured for processing the exterior portion of the ultra-wide-angle image and outputting a corrected exterior image feed for use in one or more exterior sensing functions.

13. The system according to claim 6, further comprising: the vehicle.

14. A method comprising:
receiving image data from an imager of ultra-wide-angle images having a field of view that includes an interior portion representing part of an interior of a vehicle and an exterior portion representing part of an exterior of the vehicle and not receiving image data of an excluded portion between the interior portion and exterior portion; and
processing the image data by separating the interior and exterior portions of each ultra-wide-angle image using an image splitter block;
wherein a first focal region of a lens assembly associated with the imager has a first set of optical characteristics for focusing the interior portion of the field of view onto the imager on a first side of the excluded portion, and a second focal region having a second set of optical characteristics for focusing the exterior portion of the field of view onto the imager on a second side of the excluded portion.

15. The method according to claim 14, wherein processing the image data further comprises:
 correcting image distortions using at least one de-warping block.

* * * * *